Figures 1, 2:
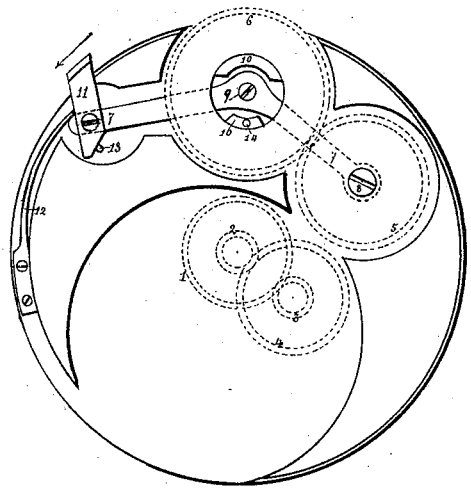

(No Model.)

A. BOURGEOIS-WEBER.
STEM WINDING AND SETTING DEVICE FOR WATCHES.

No. 302,975. Patented Aug. 5, 1884.

UNITED STATES PATENT OFFICE.

ALBERT BOURGEOIS-WEBER, OF BIENNE, SWITZERLAND.

STEM WINDING AND SETTING DEVICE FOR WATCHES.

SPECIFICATION forming part of Letters Patent No. 302,975, dated August 5, 1884.

Application filed March 24, 1884. (No model.)

*To all whom it may concern:*

Be it known that I, ALBERT BOURGEOIS-WEBER, a citizen of the Swiss Confederation, residing at Bienne, canton of Berne, in Switzerland, have invented a new and useful Improvement in Watches, of which the following is a specification.

My invention consists of a very simple, solid, and cheap mechanism for setting the hands of watches, which I call "new hand-setting lever."

In the drawings the two figures represent the setting mechanism as it presents itself when the dial, which covers the same, and which secures some parts of it, is taken off.

Figure 1 represents the mechanism at rest. Fig. 2 shows the position of the pieces composing the same when the hands were acted upon.

1 is the hour-wheel bearing the hour-hand. 2 is the cannon-pinion, the arbor of which receives the minute-hand. 3 and 4 are the intermediate wheel and pinion, which have nothing peculiar. 5 is an intermediate wheel fixed on the lever 7 by means of a screw, 8. The double-armed lever 7 oscillates upon a screw, 9, fixed in the plate of the watch. The wheel 6, gearing into 5, turns free around a segmental bearing, 10 10, forming a part of the plate. That wheel 6, which gears into 5 in whatever position of the lever 7, extends beyond the circumference of the plate and outside of the glass bezel. The wheel 6 can therefore be turned by hand, even when the glass is shut. One arm of the lever 7 bears a bolt, 11, which bears against a pin, 13, being pressed against it by the spring 12, and which bolt 11 passes through the glass bezel in order to be acted on by hand, even when the glass is shut. The bolt 11 has two beveled faces, which lean both successively against the pin 13, according as the bolt is set in the position shown in Fig. 1 or in that shown in Fig. 2. According to those two positions of the bolt 11 the double-armed lever 7 takes two corresponding positions. (Shown in the two figures of the drawings.) In the first one the lever 7 maintains the wheel 5 out of gear of wheel 4. In the second one the lever 7 engages the wheel 5 into gear with wheel 4, and produces thereby the turning of the hands, when the wheel 6 is moved by the fingers applied to its edge. My improvement allows the hands to be set without opening the glass; hence the hinge to the glass bezel is dispensed with. The segmental bearings 10 on the watch-plate for the wheel 6 allow for the use of a central opening in the wheel 6, and in this opening is the pivot for the lever 7, and the arbor of the second-hand may also pass through this opening.

I claim as my invention—

In a watch-setting mechanism, the combination, with the wheels 1 2 3 4 and hands, of the wheel 5, the lever 7, carrying such wheel 5, the bolt 11, pin 13, and the wheel 6, projecting at the edge of the bezel, and the spring 12, substantially as specified.

ALBERT BOURGEOIS-WEBER.

Witnesses:
 THÉODORE TRUER,
 ELMER SCHMID.